US012719088B2

(12) United States Patent
Lee et al.

(10) Patent No.: US 12,719,088 B2
(45) Date of Patent: Aug. 25, 2026

(54) BIPHASIC ELECTROLYTE SOLUTION COMPRISING KOSMOTROPIC METAL SALT

(71) Applicant: INDUSTRY-ACADEMIC COOPERATION FOUNDATION, YONSEI UNIVERSITY, Seoul (KR)

(72) Inventors: Sang-Young Lee, Seoul (KR); Won-Yeong Kim, Seoul (KR); Hong-I Kim, Seoul (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 409 days.

(21) Appl. No.: 18/494,866

(22) Filed: Oct. 26, 2023

(65) Prior Publication Data

US 2024/0145779 A1 May 2, 2024

(30) Foreign Application Priority Data

Oct. 27, 2022 (KR) ........................ 10-2022-0140685
Oct. 24, 2023 (KR) ........................ 10-2023-0142539

(51) Int. Cl.

*H01M 10/0567* (2010.01)
*H01M 10/052* (2010.01)
*H01M 10/0568* (2010.01)
*H01M 10/0569* (2010.01)

(52) U.S. Cl.

CPC ..... *H01M 10/0567* (2013.01); *H01M 10/052* (2013.01); *H01M 10/0568* (2013.01); *H01M 10/0569* (2013.01); *H01M 2300/0002* (2013.01); *H01M 2300/0028* (2013.01)

(58) Field of Classification Search

CPC ........... H01M 10/052; H01M 10/0567; H01M 10/0568; H01M 10/0569
See application file for complete search history.

(56) References Cited

FOREIGN PATENT DOCUMENTS

| | | | |
|---|---|---|---|
| CN | 113346147 | A | 9/2021 |
| KR | 10-2020-0071684 | A | 6/2020 |
| KR | 10-2021-0154551 | | 12/2021 |

OTHER PUBLICATIONS

Jinqiang Shi et al, "Ultrahigh coulombic efficiency and long-life aqueous Zn anodes enabled by electrolyte additive of acetonitrile" Key Laboratory of Advanced Energy Materials Chemistry (Ministry of Education), College of Chemistry, Nankai University, Tianjin 30 0 071, China, Electrochimica Acta 358 (2020) 136937 https://doi.org/10.1016/j.electacta.2020.136937 (8 pages).

Sung-Ju Cho et al, "Monolithic heterojunction quasi-solid-state battery electrolytes based on thermodynamically immiscible dual phases" Energy & Environmental Science, 2018, DOI:10.1039/C8EE01503A. (14 pages).

Xiao Liu et al, "Biphasic Electrolyte Inhibiting the Shuttle Effect of Redox Molecules in Lithium Metal Batteries" 10.1002/ange.202104003 First published: May 21, 2021 (7 pages).

Yang Dong et al, "Long-Life Zinc/Vanadium Pentoxide Battery Enabled by a Concentrated Aqueous ZnSO4 Electrolyte with Proton and Zinc Ion Co-Intercalation" ACS Appl. Energy Mater. 2020, 3, 11183-11192 (10 pages).

*Primary Examiner* — Sarah A. Slifka

(74) *Attorney, Agent, or Firm* — Carroll, Hoette & Butscher, LLC; Christopher R. Carroll

(57) ABSTRACT

Provided is a biphasic electrolyte solution including: an aqueous electrolyte solution layer including a kosmotropic metal salt and water; and a nonaqueous electrolyte solution layer including a second metal salt and a nonaqueous organic solvent, and the biphasic electrolyte solution may provide a battery which satisfies both excellent battery performance and life characteristics.

12 Claims, 3 Drawing Sheets

Example 1

Example 5

Example 6

Example 7

Example 2

Example 8

Example 12

Example 3

Example 9

Example 10

Example 4

Example 11

BIPHASIC ELECTROLYTE SOLUTION COMPRISING KOSMOTROPIC METAL SALT

CROSS-REFERENCE TO RELATED APPLICATIONS

This application claims priority under 35 U.S.C. § 119 to Korean Patent Application No. 10-2022-0140685, filed on Oct. 27, 2022, and No. 10-2023-0142539, filed on Oct. 24, 2023 in the Korean Intellectual Property Office, the disclosure of which is incorporated herein by reference in its entirety.

TECHNICAL FIELD

The following disclosure relates to a biphasic electrolyte solution including a kosmotropic metal salt, and a secondary battery including the same.

BACKGROUND

Since a secondary battery produces electrical energy by a different type of electrochemical oxidation-reduction reaction, respectively, in a positive electrode and a negative electrode, it requires operating environments different from each other, and an electrolyte acting as a medium between the positive electrode and the negative electrode needs to satisfy each of the operating environments.

To this end, a study for using electrolyte solvents different from each other so that different requirements in the positive electrode and the negative electrode may be satisfied is in progress, but in general, a solvent favorable for battery performance is a miscible solvent and it is difficult to separate the solvent. Thus, a method of physically separating two miscible electrolytes by installing a partition wall was suggested, but it has limitations in causing an inevitable loss of energy density and also decreasing ion conduction properties. In addition, a method of separating phases using an immiscible solvent having opposite polarity was suggested, but since an electrolyte including a nonpolar solvent has low salt dissociation ability and an interface between two immiscible solvents has high activation energy, there is a limitation to show low ionic conductivity.

RELATED ART DOCUMENTS

Non-Patent Documents

Angew. Chem. Int. Ed., 2021, 60, 16360-16365.
Energy Environ. Sci., 2019,12, 559-565

SUMMARY

An embodiment of the present invention is directed to providing a biphasic electrolyte solution which may satisfy both excellent ion conduction properties and compatibility of each of a positive electrode and negative electrode, and a secondary battery including the same.

In one general aspect, a biphasic electrolyte solution includes: an aqueous electrolyte solution layer including a kosmotropic metal salt and water; and a nonaqueous electrolyte solution layer including a second metal salt and a nonaqueous organic solvent, wherein the aqueous electrolyte solution layer and the nonaqueous electrolyte solution layer are included at a volume ratio of 1:0.5 to 1.5.

The nonaqueous organic solvent may be a polar organic solvent miscible with water.

The water and the polar organic solvent may be included at a volume ratio of 1:0.5 to 1.5.

The aqueous electrolyte solution layer may include the kosmotropic metal salt at a molality of 1 to 4.

The nonaqueous electrolyte solution layer may include the second metal salt at a molality of 5 or less.

The kosmotropic metal salt may be a metal sulfate salt selected from $ZnSO_4$, $Li_2SO_4$, $MgSO_4$, and $Na_2SO_4$.

The second metal salt may be a bis(trifluoromethanesulfonyl)imide metal salt, a bis(fluorosulfonyl)imide metal salt, or a trifluoromethanesulfonate metal salt.

The nonaqueous organic solvent may be selected from acetonitrile, triethyl phosphate, propylene carbonate, diglyme, and diethyl ether.

In another general aspect, a method of preparing a biphasic electrolyte solution includes: preparing an aqueous electrolyte solution including a kosmotropic metal salt and water; preparing a nonaqueous electrolyte solution including a second metal salt and a nonaqueous organic solvent; and adding the nonaqueous electrolyte solution to the aqueous electrolyte solution to prepare a biphasic electrolyte solution, wherein the biphasic electrolyte solution includes an aqueous electrolyte solution layer and a nonaqueous electrolyte solution layer forming an interface on the aqueous electrolyte solution layer, and the aqueous electrolyte solution layer and the nonaqueous electrolyte solution layer are included at a volume ratio of 1:0.5 to 1.5.

In still another general aspect, a secondary battery includes a positive electrode, the biphasic electrolyte solution according to the exemplary embodiment, and a negative electrode.

In the secondary battery according to an exemplary embodiment, an aqueous electrolyte solution layer of the biphasic electrolyte solution may be in contact with the positive electrode, and a nonaqueous electrolyte solution layer thereof may be in contact with the negative electrode.

The secondary battery according to an exemplary embodiment may be a zinc secondary battery, sodium secondary battery, a lithium secondary battery, or a magnesium secondary battery.

Other features and aspects will be apparent from the following detailed description, the drawings, and the claims.

DETAILED DESCRIPTION OF EMBODIMENTS

Figure 1:
FIG. 1 is photographs of biphasic electrolyte solutions of Examples 1 and 5 to 7.
Figure 1:
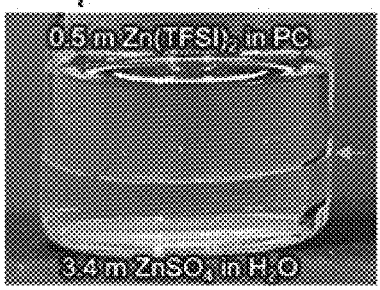
Figure 1:
Figure 1:

In the present specification, unless otherwise defined, all technical terms and scientific terms have the same meanings as those commonly understood by a person skilled in the art to which the present invention pertains. The terms used herein are only for effectively describing a certain specific example, and are not intended to limit the present invention.

The singular form used in the present specification may be intended to also include a plural form, unless otherwise indicated in the context.

Throughout the present specification, unless otherwise particularly stated, the word "comprise", "equipped", "contain", or "have" does not mean the exclusion of any other constituent element, but means further inclusion of other constituent elements, and elements, materials, or processes which are not further listed are not excluded.

The numerical range used in the present specification includes all values within the range including the lower limit and the upper limit, increments logically derived in a form and spanning in a defined range, all double limited values, and all possible combinations of the upper limit and the lower limit in the numerical range defined in different forms. Unless otherwise defined in the present specification, values which may be outside a numerical range due to experimental error or rounding off of a value are also included in the defined numerical range.

Unless otherwise particularly defined in the present specification, "about" may be considered as a value within 30%, 25%, 20%, 15%, 10%, or 5% of a stated value.

Hereinafter, the present disclosure will be described in detail. However, it is only illustrative and the present disclosure is not limited to the specific exemplary embodiment which is illustratively described.

An embodiment of the present invention provides a biphasic electrolyte solution which may satisfy both excellent ion conduction properties and compatibility of each of a positive electrode and a negative electrode.

Specifically, the biphasic electrolyte solution according to an embodiment includes: an aqueous electrolyte solution layer including a kosmotropic metal salt and water; and a nonaqueous electrolyte solution layer including a second metal salt and a nonaqueous organic solvent, wherein the aqueous electrolyte solution layer and the nonaqueous electrolyte solution layer are included at a volume ratio of 1:0.5 to 1.5.

Since the biphasic electrolyte solution according to an embodiment satisfies the configuration combination, a battery having excellent ion conductivity and life characteristics may be provided. Specifically, since the aqueous electrolyte layer of the biphasic electrolyte solution according to an embodiment includes the kosmotropic metal salt, an interface is formed and a biphase may be formed even with the use of a polar organic solvent miscible with water. In addition, both the aqueous electrolyte solution layer and the nonaqueous electrolyte solution layer have excellent salt dissociation ability and also may secure excellent ion conduction properties. In addition, the biphasic electrolyte solution according to an embodiment provides an environment required in each of a positive electrode and a negative electrode of a battery and may implement excellent life characteristics.

In an exemplary embodiment, the nonaqueous organic solvent may be a polar organic solvent miscible with water, and may further lower activation energy of a biphase interface and secure better ion conduction properties.

As an example, when the volume ratio between the aqueous electrolyte solution layer and the nonaqueous electrolyte solution layer is less than 1:0.5 or more than 1:1.5, one or more performances selected from ion conductivity, discharge capacity, and life characteristics may be significantly deteriorated.

The volume ratio between the aqueous electrolyte solution layer and the nonaqueous electrolyte solution layer according to an embodiment may be the same as the volume ratio between water and the polar organic solvent, the aqueous electrolyte solution layer and the nonaqueous electrolyte solution layer may be included at a volume ratio of 1:0.5 to 1.5, 1:0.5 to 1, or 1:0.8 to 1, specifically at a volume ratio of 1:1, and an effect of improving both battery performance such as ion conductivity and a discharge capacity, and life characteristics may be better.

The kosmotropic metal salt refers to inclusion of a kosmotropic anion and a metal cation. The kosmotropic anion refers to an anion having high kosmotropicity and may stabilize a water structure due to a strong interaction with a water molecule. Thus, activity of a water molecule may be decreased and a biphase with the polar organic solvent miscible with water may be formed.

The kosmotropic anion may be, for example, $SO_4^{2}$— or $PO_4^{3}$—, and a cation of the kosmotropic metal salt is not largely limited as long as it is a metal cation forming a pair with the kosmotropic anion, but as an example, may be $Li^+$, $Na^+$, $Mg^{2+}$, or $Zn^{2+}$. Specifically, the kosmotropic metal salt may be a metal sulfate salt selected from $ZnSO_4$, $Li_2SO_4$, $MgSO_4$, and $Na_2SO_4$.

The aqueous electrolyte solution layer according to an embodiment may include the kosmotropic metal salt at a molality of 1.0 or more, for example, at a molality of 1.0 to 4.0 or 2.0 to 4.0, but the concentration may be different depending on the specific type of kosmotropic metal salt. Within the range, the aqueous electrolyte solution layer and the nonaqueous electrolyte solution layer are not miscible and may effectively form a biphase to be intended in the present invention.

The second metal salt included in the nonaqueous electrolyte solution layer according to an embodiment may be a bis(trifluoromethanesulfonyl)imide (TFSI) metal salt, a bis (fluorosulfonyl)imide (FSI) metal salt, or a trifluoromethane sulfonate (Tf) metal salt, and a second metal salt cation is not largely limited as long as it is a metal cation paired with the anion, but as an example, may be $Li^+$, $Na^+$, $Mg^{2+}$, or $Zn^{2+}$. Specifically, it may be $Zn(TFSI)_2$, LiTFSI, $Mg(TFSI)_2$, or NaTFSI, but is not necessarily limited thereto.

The nonaqueous electrolyte solution layer may include the second metal salt at a molality of 5.0 or less, for example, at a molality of 0.01 to 5.0 or 0.01 to 3.0, but the concentration may vary depending on the specific type of second metal salt and the type of nonaqueous organic solvent. Within the range, the aqueous electrolyte solution layer and the nonaqueous electrolyte solution layer are not miscible and may effectively form a biphase to be intended in the present invention.

The nonaqueous organic solvent is not largely limited as long as it is commonly used in the art, and for example, may be selected from acetonitrile, triethyl phosphate, propylene carbonate, digylme (G2), bis(2-methoxyethyl)ether), diethyl ether, and the like.

Another embodiment of the present invention provides a method of preparing a biphasic electrolyte solution.

The method of preparing a biphasic electrolyte solution according to an embodiment may include: preparing an aqueous electrolyte solution including a kosmotropic metal salt and water; preparing a nonaqueous electrolyte solution including a second metal salt and a nonaqueous organic solvent; and adding the nonaqueous electrolyte solution to the aqueous electrolyte solution to prepare a biphasic electrolyte solution.

Herein, the biphasic electrolyte solution includes an aqueous electrolyte solution layer and a nonaqueous electrolyte solution layer which forms an interface on the aqueous electrolyte solution layer, and includes the aqueous electrolyte solution layer and the nonaqueous electrolyte solution layer at a volume ratio of 1:0.5 to 1.5.

Since the descriptions of the kosmotropic metal salt, the second metal salt, and the nonaqueous organic solvent are as described above, they will be omitted.

Another embodiment of the present invention provides a secondary battery including the biphasic electrolyte solution described above.

The secondary battery according to an embodiment may be manufactured with a structure known in the art using a common manufacturing method and common materials in the art, except for including the biphasic electrolyte solution according to an embodiment, of course.

The secondary battery according to an embodiment may include a positive electrode, the biphasic electrolyte solution described above, a separator, and a negative electrode, and an aqueous electrolyte solution layer may be in contact with the positive electrode, and a nonaqueous electrolyte solution layer may be in contact with the negative electrode.

In addition, the secondary battery according to an embodiment may be a zinc secondary battery, a sodium secondary battery, a lithium secondary battery, or a magnesium secondary battery, and specifically, may be a zinc secondary battery, but is not necessarily limited thereto.

Hereinafter, the exemplary embodiments described above will be described in detail through the following examples. However, the following examples are only for description, and do not limit the scope of rights.

Preparation Example 1

Zinc sulfate ($ZnSO_4$) was mixed with water to be a molality of 3.4 (3.4 m) to prepare an aqueous electrolyte solution.

Preparation Example 2

Zinc bis(trifluoromethanesulfonyl)imide ($Zn(TFSI)_2$) was mixed with acetonitrile (AN) to be a molality of 0.5 (0.5 m) to prepare a nonaqueous electrolyte solution.

Example 1

Zinc sulfate ($ZnSO_4$) was mixed with water to be a molality of 3.4 (3.4 m) to prepare an aqueous electrolyte solution (Preparation Example 1), and zinc bis(trifluoromethanesulfonyl)imide ($Zn(TFSI)_2$) was mixed with acetonitrile (AN) to be a molality of 0.5 (0.5 m) to prepare a nonaqueous electrolyte solution (Preparation Example 2).

Thereafter, 1 ml of the nonaqueous electrolyte solution was added to 1 ml of the aqueous electrolyte solution, and it was confirmed that the aqueous electrolyte solution layer and the nonaqueous electrolyte solution layer were separated at a volume ratio of 1:1 (FIG. 1).

Example 2

Figure 2:
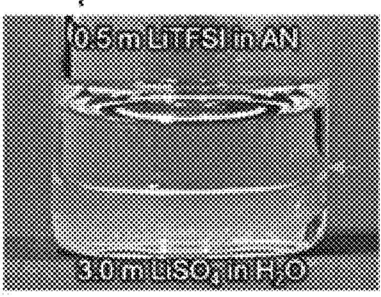
FIG. 2 is photographs of biphasic electrolyte solutions of Examples 2, 8, and 12.
Figure 2:
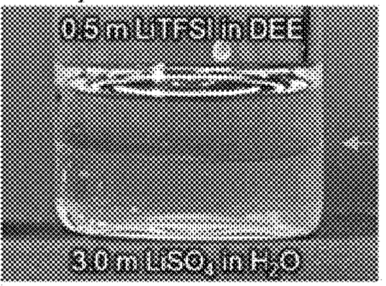
Figure 2:

The process was performed in the same manner as in Example 1, except that lithium sulfate ($Li_2SO_4$) at a molality of 3.0 was used instead of the zinc sulfate and lithium bis(trifluoromethanesulfonyl)imide (LiTFSI) was used instead of $Zn(TFSI)_2$, and it was confirmed that the aqueous electrolyte solution layer and the nonaqueous electrolyte solution layer were separated at a volume ratio of 1:1 to form a biphasic electrolyte solution (FIG. 2).

Example 3

Figure 3:
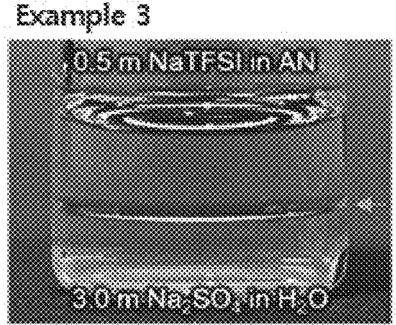
FIG. 3 is photographs of biphasic electrolyte solutions of Examples 3, 9, and 10.
Figure 3:
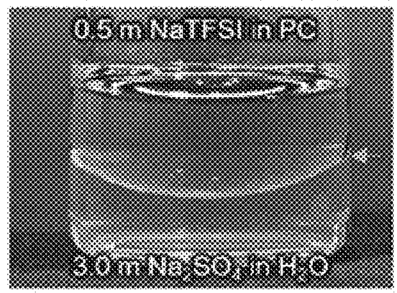
Figure 3:
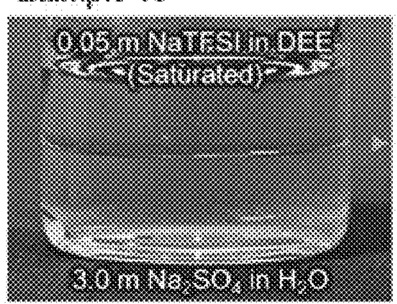

The process was performed in the same manner as in Example 1, except that sodium sulfate ($Na_2SO_4$) at a molality of 3.0 was used instead of the zinc sulfate and sodium bis(trifluoromethanesulfonyl)imide (NaTFSI) was used instead of $Zn(TFSI)_2$, and it was confirmed that the aqueous electrolyte solution layer and the nonaqueous electrolyte solution layer were separated at a volume ratio of 1:1 to form a biphasic electrolyte solution (FIG. 3).

Example 4

Figure 4:
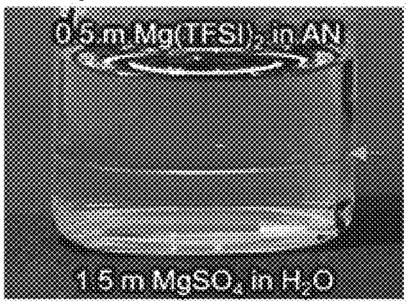
FIG. 4 is photographs of biphasic electrolyte solutions of Examples 4 and 11.
Figure 4:

The process was performed in the same manner as in Example 1, except that magnesium sulfate ($MgSO_4$) at a molality of 1.5 was used instead of the zinc sulfate and magnesium bis(trifluoromethanesulfonyl)imide ($Mg(TFSI)_2$) was used instead of $Zn(TFSI)_2$, and it was confirmed that the aqueous electrolyte solution layer and the nonaqueous electrolyte solution layer were separated at a volume ratio of 1:1 to form a biphasic electrolyte solution (FIG. 4).

Examples 5 to 7

The process was performed in the same manner as in Example 1, except that propylene carbonate (PC, Example 5), diethyl ether (DEE, Example 6), and diethylene glycol dimethyl ether (G2, Example 7) were used, respectively, instead of acetonitrile (AN) in the preparation of the nonaqueous electrolyte solution, and it was confirmed that the aqueous electrolyte solution layer and the nonaqueous electrolyte solution layer were separated at a volume ratio of 1:1 to form a biphasic electrolyte solution (FIG. 1).

Examples 8 and 12

The process was performed in the same manner as in Example 2, except that diethy ether (Example 8) and propylene carbonate (Example 12) were used instead of acetonitrile (AN) in the preparation of the nonaqueous electrolyte solution, and it was confirmed that the aqueous electrolyte solution layer and the nonaqueous electrolyte solution layer were separated at a volume ratio of 1:1 to form a biphasic electrolyte solution (FIG. 2).

Examples 9 and 10

The process was performed in the same manner as in Example 3, except that propylene carbonate (Example 9) and diethyl ether (Example 10) were used, respectively, instead of acetonitrile (AN) in the preparation of the nonaqueous electrolyte solution, and it was confirmed that the aqueous electrolyte solution layer and the nonaqueous electrolyte solution layer were separated at a volume ratio of 1:1 to form a biphasic electrolyte solution (FIG. 3).

Example 11

The process was performed in the same manner as in Example 4, except that diethyl ether was used instead of acetonitrile (AN) and $Mg(TFSI)_2$ at a molality of 0.05 was used in the preparation of the nonaqueous electrolyte solution, and it was confirmed that the aqueous electrolyte solution layer and the nonaqueous electrolyte solution layer were separated at a volume ratio of 1:1 to form a biphasic electrolyte solution (FIG. 4).

Comparative Example 1

Figure 5:
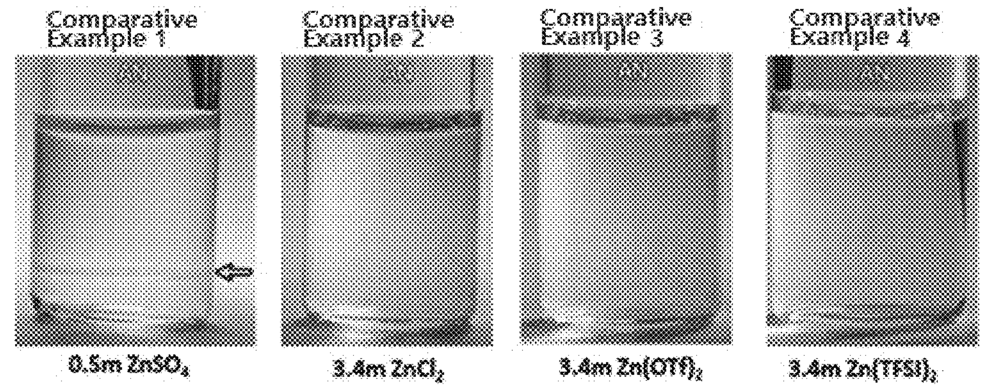
FIG. 5 is photographs of biphasic electrolyte solutions of Comparative Examples 1 to 4.

The process was performed in the same manner as in Example 1 except that the concentration of zinc sulfate ($ZnSO_4$) was changed to a molality of 0.5 in the preparation of the aqueous electrolyte solution (FIG. 5).

Comparative Examples 2 to 4

The process was performed in the same manner as in Example 1 except that $ZnCl_2$ (Comparative Example 2), $Zn(OTf)_2$ (Comparative Example 3), and $Zn(TFSI)_2$ (Comparative Example 4) were used, respectively, instead of zinc sulfate in the preparation of the aqueous electrolyte solution (FIG. 5).

Referring to FIGS. 1 to 4, it was confirmed that in all of the electrolyte solutions prepared from Examples 1 to 11, the aqueous electrolyte solution layer and the nonaqueous electrolyte solution layer were separated at the same volume ratio as the added amounts to form a biphasic electrolyte solution.

However, referring to FIG. 5, it is shown that in the case of the electrolyte solution of Comparative Example 1, though the aqueous electrolyte solution and the nonaqueous electrolyte solution were added at the same volume ratio, a significant amount of water was mixed in the nonaqueous layer, and the biphase to be intended in the present invention was not able to be formed. In addition, in the case of the electrolyte solutions of Comparative Examples 2 to 4, it is shown that since the aqueous electrolyte solution layer did not include the kosmotripic anion, the aqueous electrolyte solution layer and the nonaqueous electrolyte solution layer were completely mixed with each other and the biphase was not able to be completely formed.

<Manufacture of Secondary Battery>

Example 12

$CaV_6O_{16}\cdot 3H_2O$(CVO) as a positive electrode active material, carbon black as a conductive material, and polyvinylidene fluoride (PVdF) as a binder were added at 70 wt %, 20 wt %, and 10 wt %, respectively, to N-methyl-2-pyrrolidone (NMP) as a solvent to prepare a positive electrode slurry. The positive electrode slurry was applied on a stainless steel (SUS) thin film as a positive current collector having a thickness of 20 μm and dried, and roll pressing was performed to manufacture a positive electrode on which a positive electrode active material layer having a thickness of 25 μm was formed.

A glass fiber separator (Whatman, GF/C, 180 μm) was interposed between the positive electrode manufactured above and a zinc metal negative electrode having a thickness of 30 μm and assembled in a stacking manner, the aqueous electrolyte solution (AE) of Preparation Example 1 was oriented in the direction of the positive electrode and the nonaqueous electrolyte solution of Preparation Example 2 (OE) was oriented in the direction of a zinc metal negative electrode, and the electrolyte solutions were injected into the separator to manufacture the secondary battery of Example 11.

Comparative Example 5

The secondary battery of Comparative Example 5 was manufactured in the same manner as in Example 11, except that after the positive electrode, the negative electrode, and the separator were assembled, only the aqueous electrolyte solution of Preparation Example 1 was injected.

Comparative Example 6

The secondary battery of Comparative Example 6 was manufactured in the same manner as in Example 11, except that after the positive electrode, the negative electrode, and the separator were assembled, only the nonaqueous electrolyte solution of Preparation Example 2 was injected.

Comparative Example 7

The secondary battery of Comparative Example 7 was manufactured in the same manner as in Example 11, except that after the positive electrode, the negative electrode, and the separator were assembled, the electrolyte solution obtained in Comparative Example 1 was injected.

Evaluation Examples

Evaluation 1. Ion Conductivity

Figure 6:
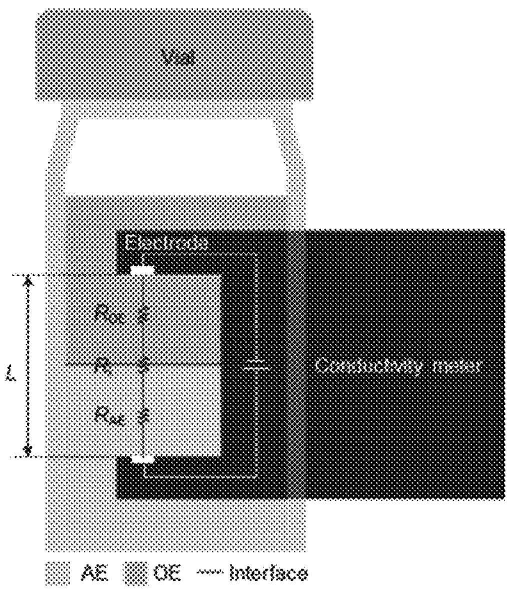
FIG. 6 is a schematic diagram of measuring ion conductivity of a biphasic electrolyte solution according to an exemplary embodiment.

The ion conductivity of the biphasic electrolyte solution of Example 1 was evaluated using conductivity meter equipment (Mettler toledo, Seven Compact 5230) (FIG. 6). The biphasic electrolyte solution of Example 1 was confirmed to have a high ion conductivity of 37.0 mS/cm.

Evaluation 2. Life Characteristics

The capacity retention rates of the secondary batteries manufactured in Example 11 and Comparative Examples 5 to 7 were measured to evaluate life characteristics. Specifically, each secondary battery was repeatedly charged/discharged 3,500 times under a current of 0.5 mA/g in a voltage range of 0.20 to 1.6 V at room temperature (25° C.). Thereafter, the capacity retention rate (%) was calculated as a percentage of a value obtained by dividing a discharge capacity in 3,500 cycles by a discharge capacity in one cycle, and the results are shown in FIG. 7 and the following Table 1.

TABLE 1

| | Example 11 | Comparative Example 5 | Comparative Example 6 |
|---|---|---|---|
| Initial discharge capacity | 160 mAh/g | 166 mAh/g | 76 mAh/g |
| Capacity retention rate (%) | 86.6% (@3,500 cycle) | 45.3% (@837 cycle) | 19.9% (@300 cycle) |

Figure 7:
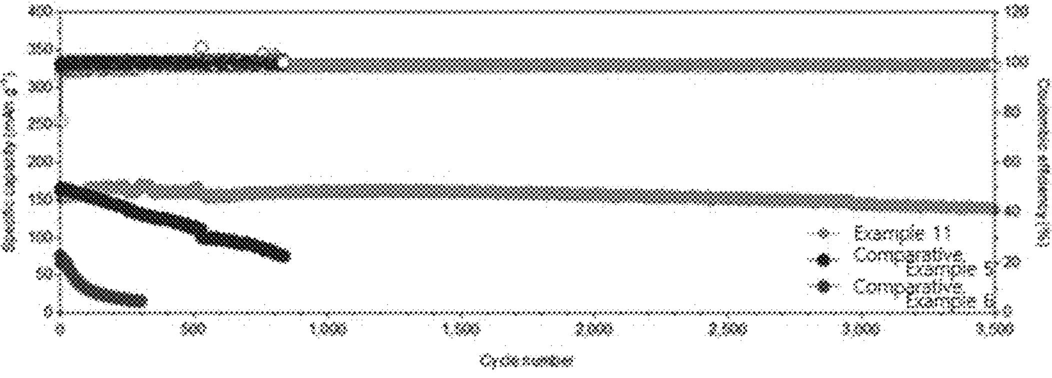
FIG. 7 shows results of evaluating life characteristics of Evaluation Example 2.

Referring to Table 1 and FIG. 7, it was confirmed that the secondary battery of Example 11 including the biphasic electrolyte solution according to Example 1 had both an excellent initial discharge capacity and excellent life characteristics, and implemented a capacity retention rate of 86.6% even after 3,500 cycles.

However, the secondary battery of Comparative Example 5 including only the aqueous electrolyte solution had a similar initial capacity value to Example 8, but showed sharply dropped capacity of a capacity retention rate of 45.3% at 837 cycles. In addition, the secondary battery of Comparative Example 6 including only the nonaqueous electrolyte solution had an initial discharge capacity and a capacity retention rate both of which were significantly deteriorated, and showed very deteriorated life characteristics with a capacity retention rate of 19.9% at 300 cycles. In addition, though Comparative Example 7 included both the aqueous electrolyte solution and the nonaqueous electrolyte solution, it was confirmed that the electrolyte solution did not form the biphase well and the life characteristics were greatly deteriorated.

The biphasic electrolyte solution according to an exemplary embodiment may provide a secondary battery which satisfies both excellent battery performance and life characteristics.

Specifically, the biphasic electrolyte solution according to an exemplary embodiment includes an aqueous electrolyte solution layer and a nonaqueous electrolyte solution layer, and since an organic solvent included in the nonaqueous electrolyte solution layer has excellent salt dissociation ability and also may lower activation energy on an interface, excellent ion conduction properties may be secured. Simultaneously, though the biphasic electrolyte solution according to an exemplary embodiment uses solvents miscible with each other, it may effectively form a biphase, and provide an environment required in each of a positive electrode and a negative electrode of a battery, thereby implementing excellent life characteristics.

Hereinabove, although the present invention has been described by specific exemplary embodiments, they have been provided only for assisting in the entire understanding of the present invention. Therefore, the present invention is not limited to the exemplary embodiments. Various modifications and changes may be made by those skilled in the art to which the present invention pertains from this description.

Therefore, the spirit of the present invention should not be limited to the above-described exemplary embodiments, and the following claims as well as all modifications equal or equivalent to the claims are intended to fall within the scope and spirit of the invention.

What is claimed is:

1. A biphasic electrolyte solution comprising:

an aqueous electrolyte solution layer including a kosmotropic metal salt and water; and a nonaqueous electrolyte solution layer including a second metal salt and a nonaqueous organic solvent, wherein the aqueous electrolyte solution layer and the nonaqueous electrolyte solution layer are included at a volume ratio of 1:0.5 to 1.5.

2. The biphasic electrolyte solution of claim 1, wherein the nonaqueous organic solvent is a polar organic solvent miscible with water.

3. The biphasic electrolyte solution of claim 1, wherein the water and the polar organic solvent are included at a volume ratio of 1:0.5 to 1.5.

4. The biphasic electrolyte solution of claim 1, wherein the aqueous electrolyte solution layer includes the kosmotropic metal salt at a molality of 1 to 4.

5. The biphasic electrolyte solution of claim 1, wherein the nonaqueous electrolyte solution layer includes the second metal salt at a molality of 5 or less.

6. The biphasic electrolyte solution of claim 1, wherein the kosmotropic metal salt is a metal sulfate salt selected from $ZnSO_4$, $Li_2SO_4$, $MgSO_4$, and $Na_2SO_4$.

7. The biphasic electrolyte solution of claim 1, wherein the second metal salt is a bis(trifluoromethanesulfonyl)imide metal salt, a bis(fluorosulfonyl)imide metal salt, or a trifluoromethanesulfonate metal salt.

8. The biphasic electrolyte solution of claim 1, wherein the nonaqueous organic solvent is selected from acetonitrile, triethyl phosphate, propylene carbonate, diglyme, and diethyl ether.

9. A method of preparing a biphasic electrolyte solution, the method comprising:

preparing an aqueous electrolyte solution including a kosmotropic metal salt and water;

preparing a nonaqueous electrolyte solution including a second metal salt and a nonaqueous organic solvent; and adding the nonaqueous electrolyte solution to the aqueous electrolyte solution to prepare the biphasic electrolyte solution, wherein the biphasic electrolyte solution includes an aqueous electrolyte solution layer and a nonaqueous electrolyte solution layer forming an interface on the aqueous electrolyte solution layer, and the aqueous electrolyte solution layer and the nonaqueous electrolyte solution layer are included at a volume ratio of 1:0.5 to 1.5.

10. A secondary battery comprising a positive electrode, the biphasic electrolyte solution of claim 1, and a negative electrode.

11. The secondary battery of claim 10, wherein the aqueous electrolyte solution layer is in contact with the positive electrode, and the nonaqueous electrolyte solution layer is in contact with the negative electrode.

12. The secondary battery of claim 11, wherein the secondary battery is a sodium secondary battery, a lithium secondary battery, or a magnesium secondary battery.

* * * * *